Figure 1:
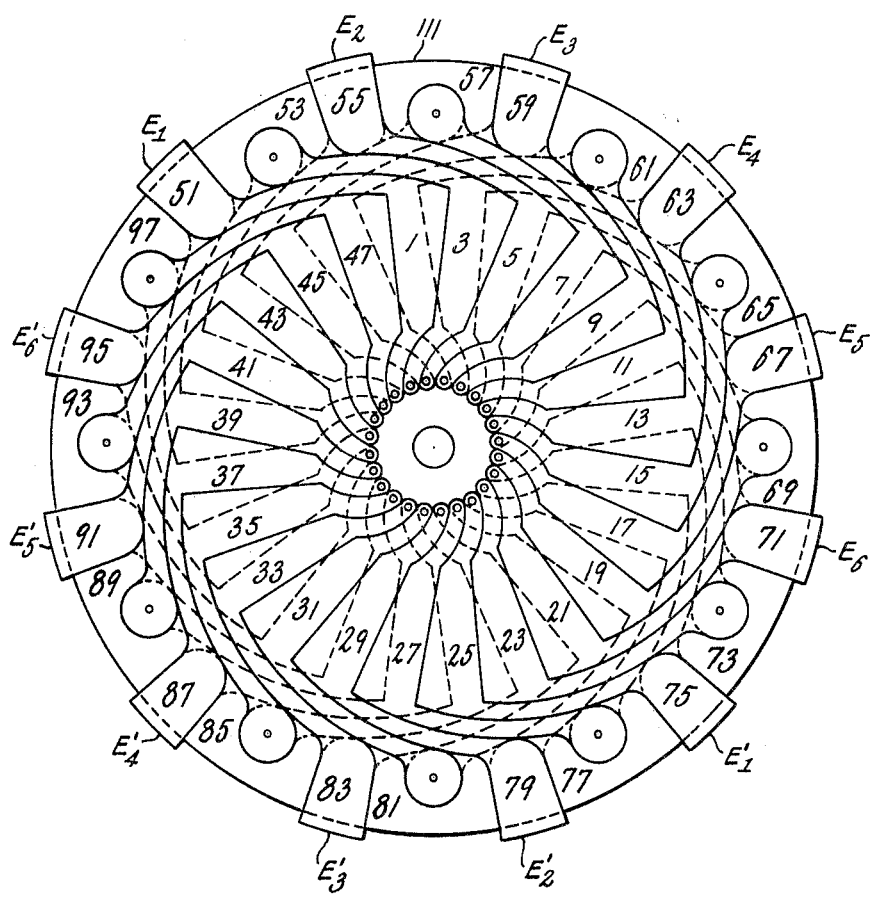

Jan. 4, 1966  J. HENRY-BAUDOT  3,227,903
ELECTRICAL WINDING STRUCTURE
Filed Feb. 14, 1961  2 Sheets-Sheet 1

INVENTOR.
JACQUES HENRY-BAUDOT
BY Charles A. Blank
ATTORNEY

Jan. 4, 1966  J. HENRY-BAUDOT  3,227,903
ELECTRICAL WINDING STRUCTURE
Filed Feb. 14, 1961  2 Sheets-Sheet 2

INVENTOR.
JACQUES HENRY-BAUDOT
BY Charles A. Black
ATTORNEY

3,227,903
ELECTRICAL WINDING STRUCTURE
Jacques Henry-Baudot, Antony, France, assignor to Printed Motors, Inc., New York, N.Y., a corporation of Delaware
Filed Feb. 14, 1961, Ser. No. 89,308
Claims priority, application France, Mar. 17, 1960, 821,849, Patent 1,203,503
2 Claims. (Cl. 310—268)

This invention relates to electrical rotating machines and, more particularly, to such machines having axial air gaps and inductive windings formed by flat conductors adhering intimately to the insulating surfaces of a support upon which these conductors are disposed in two sets of interconnected half turns to constitute a complete winding. The conductors of such windings preferably are printed circuit conductors which may be formed by any well-known printing, plating or etching technique.

As explained in applicant's copending application Serial No. 761,144, filed September 15, 1958, now Patent No. 3,060,337, with reference to copending application Serial No. 691,434, filed October 21, 1957, now Patent No. 3,090,880, an alternating-current winding may be derived from a printed-circuit direct-current winding by forming supply terminals and openings in the winding for feeding alternating-current. In particular, an alternating-current winding has been formed in accordance with a wave-wound pattern, with an odd number of turns which involves non-integral divisions of the winding, rendering it difficult to establish input and output terminals in the winding. In alternating-current polyphase windings, this also may result in an unbalance of one or more phases with respect to the others.

To avoid these limitations, applicant's copending application Serial No. 780,754, filed December 16, 1958, now Patent No. 2,993,135, provides for lengthening the extremities of certain conductors along inclined lines, thereby skipping interconnections between selected back-to-back conductors of the two faces to establish output terminals at desired points.

To avoid selective lengthening of the conductors for the connections in such windings, while maintaining an integral number of divisions of the winding on each face of the supporting member, the present invention provides a winding with the same number of paths for each phase as the number of pairs of poles of the machine, with the paths for each phase in parallel. This permits, when needed, forming the winding in a star connection by simply joining selected terminals of one face with a conductive annulus.

Before explaining the invention in detail, reference is made to the following example, namely a six-phase winding in a star connection for a 4-pole machine. This winding is represented with 24 conductors on each face only, with two conductors per path, but, in accordance with the invention, a higher number of conductors per path may be utilized, or a different number of phases and poles.

In accordance with the invention, an electrical winding structure for an electrical rotating machine comprises a supporting disc and an alternating-current polyphase winding comprising substantially planar conductors distributed on each surface of the disc and extending toward the periphery of the disc. The conductors form a series winding for each phase and constitute a plurality of pairs of poles. The winding has for each phase a plurality of conductive paths equal to the plurality of pairs of poles.

For a better understanding of the present invention, together with other and further objects thereof, reference is made to the following description, taken in connection with the accompanying drawings, and its scope will be pointed out in the appended claims.

Figure 2:
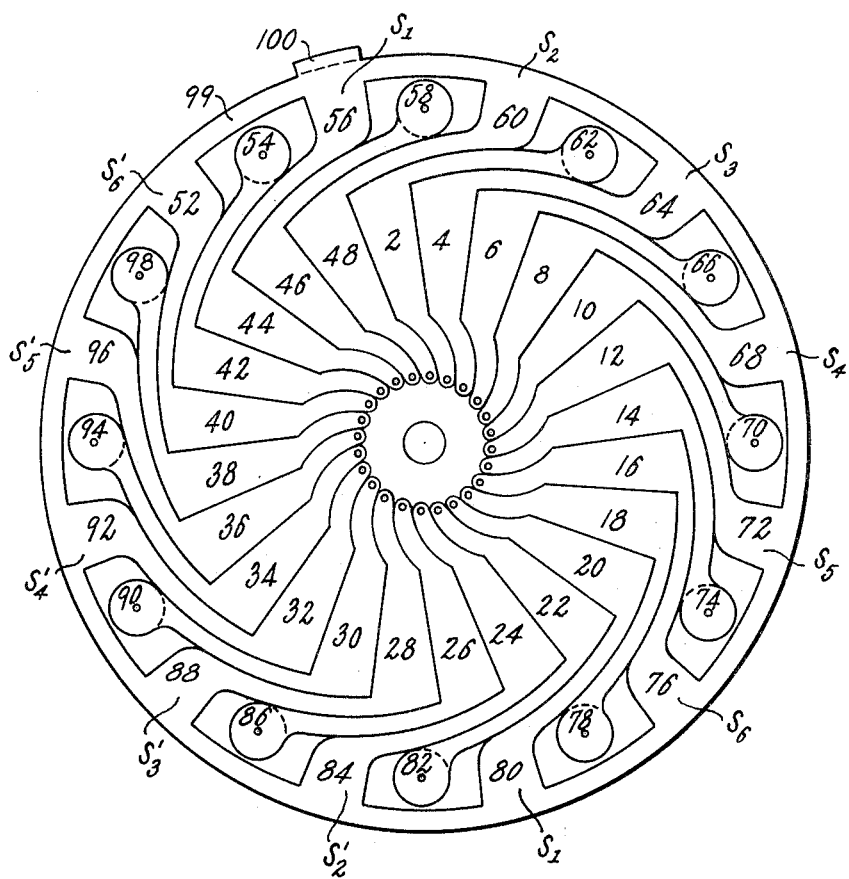

Referring to the drawing:

FIG. 1 is a view of a face of the winding which will be referred to hereinafter as a front face; and FIG. 2 is a view of the rear face, taken from the same side of the winding as FIG. 1 while considering the insulating support to be omitted and the conductors of the front face to be omitted.

Referring to FIG. 1, the full line construction outlines the conductors on the front face of the disc of the insulating support 111 and the broken line construction outlines the conductors on the rear face. The conductors of the front face are numbered 1, 3 . . . to 47 and those on the rear face are numbered 2, 4 . . . to 48. Each half turn conductor includes a substantially radial portion terminated by curved portions which define the exterior step and the interior step of the winding. On the exterior periphery, these curved portions terminate in regions numbered 51, 53 . . . to 97 on the front face and 52, 54 . . . to 98 on the rear face in correspondence with the conductors 1 to 47 on the front face and 40–48, 2–38 on the rear face, respectively. On the interior periphery the curved portions terminate in unnumbered regions. The conductors on the front and rear faces form a series lap winding.

While making the winding the terminal regions can be made at the same time as the coating forming the half turn conductors after which the interconnections may be formed by suitable plated apertures, by rivets, or the like. Interconnections are formed at all interior regions and at all exterior regions except those serving as input-current terminals. Alternate regions of the exterior row serve as interconnections between faces. The intervening regions form input-current terminals on the front face, and terminals on the rear face connected by one conductive annulus 99 provided with a strip terminal 100. This is effective to form a star connection. If it is desired to form some other winding arrangement, the conductors connected to the annulus could be formed instead with terminals similar to those on the front face.

The region 51 of the front face serves as, for example, the input terminal for the first path of the first phase. It is extended to form a strip terminal connection on the periphery of the support 111. It is not interconnected to the region 52 of the rear face, which is the output terminal $S'_6$ of the second path of the sixth phase. The output terminal $S_1$ of the firs path of the first phase is at region 56 on the rear face and this path can be traced from region 51 to region 56 as follows: region 51, conductor 1, conductor 42, region 54, region 53, conductor 3, conductor 44, region 56. The second path of the first phase starts at region 75 of the front face diametrically opposite region 51 of the front face and terminates at a region 80 of the rear face diametrically opposite region 56 of the rear face.

The second path is therefore, symmetrical and diametrically opposite the first path. The second phase also occupies symmetrical paths. The first path of the second phase extends from region 55, input terminal $E_2$, of the front face to region 60, output terminal $S_2$, of the rear face. The second path of the second phase extends from region 79, terminal $E'_2$, of the front face to region 84, terminal $S'_2$ of the rear face. If desired, strip terminals could be established on the entire periphery of the winding.

While there has been described what is at present considered to be the preferred embodiment of the invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. An electrical winding structure for an electrical rotating machine comprising: a supporting disc; and an alternating-current polyphase winding comprising substantially planar conductors distributed in half turns on each surface of said disc and extending toward the periphery of said disc with a half turn on each surface of said disc connected in series with a half turn on the opposite surface of said disc, said winding comprising at the outer periphery thereof an annular array of terminal portions on each surface of said disc for translating alternating-current polyphase signals, said terminal portions being uniformly distributed on both sides of said disc and alternate terminal portions on one surface of said disc being insulated from corresponding terminal portions on the opposite surface of said disc to form with said conductors independent alternating-current series winding portions comprising a plurality of conductive alternating-current circuit paths for each phase, a conductive annulus at the outer periphery of said disc connected to said alternate selected terminal portions on one surface of said disc to form a star connection of said conductors, each of said conductive circuit paths including a plurality of said half turns, said series winding portions constituting a plurality of pairs of poles, said winding having for each phase a plurality of conductive circuit paths equal to said plurality of pairs of poles.

2. An electrical winding structure for an electrical rotating machine comprising: a substantially circular supporting disc of insulating material; and an alternating-current polyphase winding comprising substantially planar printed-circuit conductors distributed in half turns on each surface of said disc and extending toward the periphery of said disc with a half turn on each surface of said disc connected in series with a half turn on the opposite surface of said disc, said conductors forming a series lap winding for each phase, said winding comprising at the outer periphery thereof an annular array of terminal portions on each surface of said disc for translating alternating-current polyphase signals, alternate terminal portions on one surface of said disc being insulated from corresponding terminal portions on the opposite surface of said disc to form with said conductors independent alternating-current series winding portions comprising a plurality of conductive alternating-current circuit paths for each phase, each of said conductive circuit paths including a plurality of said half turns, said series winding portions constituting a plurality of pairs of poles, a conductive annulus connected to said alternate terminal portions on one surface of said disc to form a star connection of said conductors, said winding having for each phase a plurality of conductive circuit paths equal to said plurality of pairs of poles, and said plurality of paths for each phase being adapted for connection in parallel.

References Cited by the Examiner
UNITED STATES PATENTS

| | | | |
|---|---|---|---|
| 2,993,135 | 7/1961 | Henry-Baudot | 310—268 X |
| 3,050,650 | 1/1962 | Henry-Baudot | 310—268 |
| 3,095,516 | 6/1963 | Moressee et al. | 310—268 |

ORIS L. RADER, *Primary Examiner.*

MILTON O. HIRSHFIELD, *Examiner.*